US006401182B1

United States Patent
Sweeney

(12) United States Patent
(10) Patent No.: US 6,401,182 B1
(45) Date of Patent: Jun. 4, 2002

(54) METHOD AND APPARATUS FOR MEMORY MANAGEMENT

(75) Inventor: Peter F. Sweeney, Spring Valley, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/247,495

(22) Filed: Feb. 10, 1999

(51) Int. Cl.[7] .............................................. G06F 12/00
(52) U.S. Cl. ...................................... 711/171; 711/172
(58) Field of Search ................................ 711/171, 172, 711/170

(56) References Cited

U.S. PATENT DOCUMENTS 5,784,699 A * 7/1998 McMahon et al. ........... 711/171
5,903,900 A * 5/1999 Knipped et al. ............. 707/206
6,154,823 A * 11/2000 Benayon et al. ............. 711/171

OTHER PUBLICATIONS

Wilson, et al., "Dynamic Storage Allocation: A Survey and Critical Review", pp. 1–78, 1995.
Larus, et al., "EEL: Machine–Independent Executable Editing", Association of Computing Machinery, SIGPLAN Conference on Programming Language Design and Implementation, pp. 291–300, 1995.
Ball, et al., "Branch Prediction For Free", Computer Sciences Department, University of Wisconsin, Technical Report#1137, pp. 1–28, 1993.
Grunwald, et al., "CustoMalloc: Efficient Synthesized Memory Allocators", Software–Practice and Experience, vol. 23(8), pp. 851–869, 1993.

* cited by examiner

Primary Examiner—Matthew Kim
Assistant Examiner—Christian Chace
(74) Attorney, Agent, or Firm—F. Chau & Associates, LLP

(57) ABSTRACT

A method for improving memory utilization includes measuring an alignment requirement corresponding to each of a plurality of data structures. Storage of the plurality of data structures in a data memory is arranged based on said alignment requirements.

10 Claims, 15 Drawing Sheets procedure *CustomizeExplicitMemoryManagement(Program P)*
begin /* Phase 1: program analysis to find all types that are allocated off the heap */

[1]     Let R = {};
[2]     for each statement *s* in *P* do
[3]       if *s* is a call to the heap manager then
[4]         Let *t* be the type of the data structure that is allocated off of the heap in *s*;
[5]         Let R = R ∪ { <*t*,*alignmentOf(t)*, *size Of(s)*> }:
[6]       endif
[7]     end for /* Phase 2: generated customized memory management routines */

[8]     Let S = {};
[9]     call GenerateCustomizedRoutines(R, S);

/* Phase 3: update program to use customized memory routines */

[10]    for each statement *s* in *P* do
      /* When the memory request size is unknown at compile-time */
[11]      if *s* is a call to the heap manager then
[12]        if size *Of(s)* is *unknown* then
[13]          Let *t* be the type of the data structure that is allocated off of the heap in *s*;
[14]          Let *a* be *alignmentOf(t)*;
[15]          if call to heap manager is allocate then
[16]            Replace with *malloc_a* the heap manager call in *s*;
[17]          else
[18]            Replace with *free_a* the heap manager call in *s*;
[19]          end if
[20]        end if
[21]      end if
      /* When the memory request size is known at compile-time */
[22]    call UpdateProgram(S, P)
    end;

FIG. 6

```
       /* Phase 2: generate customized memory management routines
                  when the memory request size is known at compile-time */
       procedure GenerateCustomizedRoutines(R, S)
       begin
[1]        for each <t,a,l> ∈ R do
[2]            if l is known then        /* Size is known at compile-time */
                   /* There is at most one pair of routines for size l */
[3]                if malloc_lt_at ∈ S and l == lt then
[4]                    if a > at then
[5]                        S -= {<t,malloc_lt_at, free_lt_at>}
[6]                        S += {<t,malloc_l_a, free_l_a>}
[7]                    end if
[8]                else
                       /* Create the initial pair of routines for size l */
[9]                    S += {<t,malloc_l_a, free_l_a>}
[10]               end if
[11]           end if
[12]       end for
       end;
```

FIG. 7

/* Phase 3: update program to use customized memory routines generated in Phase 2 */
procedure UpdateProgram(S,P)
begin
[1]     for each statement s in P do
[2]         if s is a call to the heap manager then
[3]             if sizeOf(s) is known then /* size is known at compile-time */
[4]                 Let t be the type of the data structure that is allocated off of the heap in s;
[5]                 Let l be sizeOf(s) and a be alignmentOf(t);
[6]                 Let <t,malloc_l_a, free_l_a> ∈ S;
[7]                 if call to heap manager is allocate then
[8]                     Replace with malloc_l_a the heap manager call in s;
[9]                 else
[10]                    Replace with free_l_a the heap manager call in s;
[11]                end if
[12]            end if
[13]        end if
[14]    end for
end;

FIG. 8

/* Phase 3: update program to use customized memory routines generated in Phase 2 */
procedure UpdateProgram(S,P)
begin
[1]     for each <t,malloc_l_a, free_l_a> ∈ S do
[2]         Add to t's class a new method that calls malloc_l_a.
[3]         Add to t's class a delete method that calls free_l_a.
[4]     end for
end;

FIG. 9

```
#include <stdio_h>
typedef struct {
    int x;
    double y;
    char c;
} T1;          /* size: 24 bytes; alignment: 8 bytes */
typedef struct {
    int z[6];
} T2;          /* size: 24 bytes; alignment: 4 bytes */
typedef struct {
    int i;
    char s[10];
}T3;           /* size: 16 bytes; alignment: 4 bytes */
void main() {
    int i;
    T1 *T1_ptr;
    T2 *T2_ptr, *T2_array_ptr;
    T3 *T3_ptr;
s1: scanf("%d",i);                                  /* read the value of i from the console */
s2: T1_ptr=(T1*) malloc(sizeof(T1));                /* heap allocate a T1 data structure */
s3: T2_ptr=(T2*) malloc(sizeof(T2));                /* heap allocate a T2 data structure */
s4: T2_array_ptr=(T2*) malloc(i*sizeof(T2));        /* heap allocate an array of T2 data structures */
s5: T3_ptr=(T3*) malloc(sizeof(T3));                /* heap allocate a T3 data structure */
    ...
s6: free(T1_ptr);                                   /* free the T1 data structure */
s7: free(T2_ptr);                                   /* free the T2 data strudture */
s8: free(T2_array_ptr);                             /* free the array of T2 data structures */
s9: free(T3_ptr);                                   /* free the T3 data structure */
}
```

FIG. 10

```
void main() {
    ...                                          /* the local declarations do not change */
s1: scanf("%d",i);                               /* read the value of i from the console */
s2: T1_ptr=(T1*) malloc_8_24();                  /* heap allocate a T1 data structure */
s3: T2_ptr=(T2*) malloc_8_24();                  /* heap allocate a T2 data structure */
s4: T2_array_ptr=(T2*) malloc_4(i*sizeof(T2));   /* heap allocate an array of T3 data structures */
s5: T3_ptr=(T3*) malloc_4_16();                  /* heap allocate a T3 data structure */
    ...
s6: free_8_24(T1_ptr);                           /* free the T1 data structure */
s7: free_8_24(T2_ptr);                           /* free the T2 data structure */
s8: free_4(T2_array_ptr);                        /* free the array of T2 data structures */
s9: free_4_16(T3_ptr);                           /* free the T3 data structure */
}
```

FIG. 11

```
class T1{
    int x;
    double y;
    char c;
};                                          // size: 24 bytes; alignment: 8 bytes
class T2{
    int z[6];
};                                          // size: 24 bytes; alignment: 4 bytes
class T3{
    int i
    char s[10]
};                                          // size: 16 bytes; alignment: 4 bytes
void main(){
    int i;
    T1 *T1_ptr;
    T2 *T2_ptr, *T2_array_ptr;
    T3 *T3_ptr;
s1: scanf("%d",i);                          /* read the value of i from the console */
s2: T1_ptr=new T1;                          /* heap allocate a T1 data structure */
s3: T2_ptr=new T2;                          /* heap allocate a T2 data structure */
s4: T2_array_ptr=new T2[i];                 /* heap allocate an array of T2 data structures */
s5: T3_ptr=new T3:                          /* heap allocate a T3 data structure */
    ...
s6: delete T1_ptr;                          /* free the T1 data structure */
s7: delete T2_ptr;                          /* free the T2 data structure */
s8: delete [] T2_array_ptr;                 /* free the array of T2 data structures */
s9: delete T3_ptr;                          /* free the T3 data structure */
}
```

FIG. 12

```
class T1 {
    int x;
    double y;
    char c;
    void * operator new(size_t size) { return (T1 *)malloc_8_24();}
    void operator delete(void *T1_ptr) { free_8_24(T1_ptr); }
};              // size: 24 bytes; alignment: 8 bytes class T2 {
    int z[6];
    void * operator new(size_t size) { return (T2 *)malloc_8_24(); }
    void operator delete(void *T2_ptr) { free_8_24(T2_ptr); }
    void * operator new [](size_t size) [] { return (T2 *)malloc_4(int size); }
    void operator delete(void *T2_ptr) { free_4(T2_ptr); }
};              // size: 24 bytes; alignment: 4 bytes class T3 {
    int i;
    char s[10];
    void * operator new(size_t size) { return (T3 *)malloc_4_16(); }
    void operator delete(void *T3_ptr) { free_4_16(T3_ptr); }
};              // size: 24 bytes; alignment: 4 bytes void main () {
// Only the statements that change in main are presented.
    ...
s4: T2_array_ptr=new T2 [i];  /*heap allocate an array of T2 data structures */
    ...
s8: delete [] T2_array_ptr;              /* free the array of T2 data structures */
    ...
}
```

FIG. 13

METHOD AND APPARATUS FOR MEMORY MANAGEMENT

TECHNICAL FIELD

The present invention relates generally to memory management and more particularly to explicit memory management. Specifically, a method and apparatus are provided for memory management based upon characteristics of memory requested.

BACKGROUND OF THE INVENTION

Computer programs are typically algorithms that manipulate data to compute a result. A block of memory to store data must first be allocated before the data can be manipulated. When the data is no longer needed, the block of the memory is then deallocated or freed. Allocation and deallocation of the block of memory is commonly referred to as memory management.

Some programming languages(i.e., C, Pascal, Ada, C++, . . . ) allow a programmer to explicitly control memory management. Some of these programming languages (i.e., C, Pascal, C++) require explicit memory management by a programmer when at compile-time: the life-time of a data structure is not known; the size of a data structure is not known; or, the life-time of the program region that allocates a data structure terminates before the life-time of the data structure. These memory allocators are sometimes referred to as dynamic storage allocators because memory must be explicitly managed when information is only known at run-time.

Typically, an operating system provides a memory management service to programming languages. An application may use this service to explicitly manage memory to allocate a block of memory from an unused store of memory known as the free store or the heap. This service is typically called a heap manager.

A heap manager allocates arbitrary size blocks of memory interspersed with requests in arbitrary order to deallocate already allocated blocks of memory. Typically, each allocated block of memory does not overlap other allocated blocks of memory and a heap manager allocates or deallocates only an entire block of storage independent of the type or values of data stored in the block. In some programming languages (i.e., C, Pascal, Ada, C++) the block of memory in which data is stored may not be reallocated to compact memory while the data is in use because the heap manager cannot find and update pointers to the block of memory if it is reallocated.

Many computer architectures incur a performance penalty for accessing unaligned storage of data in memory. Stored data is unaligned if a data type is not on an appropriate boundary in memory. For example, when the alignment requirement is a word of four bytes, stored data is "aligned" when its starting address is divisible by four. The performance penalty for accessing unaligned memory may include additional instruction cycles, poor cache utilization, and/or the introduction of bubbles into the execution pipeline.

FIG. 1 illustrates an example of a block 100 of memory allocated by a heap manager for storing a data structure 102. The data structure 102 includes two character (char) type data units 104, 108 and one integer (int) type data unit 106. Each char type data unit 104, 108 requires one byte of storage and each int type data unit 106 requires four bytes (one word) of storage. The data units 104, 106, 108 are arranged in the data structure 102 in the order of char, int, char.

A compiler can provide a properly aligned data structure 102 by ensuring that the data structure 102 starts and ends on an alignment boundary. The alignment requirement corresponding to the data structure 102 is the largest size of any one of its data units 104, 106, 108. Thus, the alignment requirement corresponding to data structure 102 is four bytes because the int type data unit 106 has a size of four bytes and is larger than the char type data units 104, 108.

Each data unit 104, 106, 108 included in the data structure 102 is aligned according to the data structure 102 alignment requirement of four bytes. Thus, the char type data unit 104 is followed by three bytes of padding 105 and other char type data unit 108 is also followed by three bytes of padding 109. Thus, 12 bytes of memory are used to store the data units 104, 106, 108 which alone have a total size of only six bytes.

The heap manager allocates the block of memory 100 according to the heap manager's alignment requirement. In order to align memory access for all possible memory requests, the heap manager's alignment requirement equals the size of the largest data unit for all possible memory requests. In the example illustrated in FIG. 1, the heap manager's alignment requirement is eight bytes (double word).

The block 100 of memory includes a header 111 which includes a header size 110 indicating the size of the allocated memory and a header padding 112. In this example, the header size 110 is four bytes and the header padding 112 is four bytes. The header padding 112 is necessary so the data structure 102 begins on an alignment boundary (double word). Internal fragmentation 114 of four bytes at the end of the block 100 of memory allows the block 100 to end on a double word alignment boundary.

Internal fragmentation and large headers may pollute memory with unused data which may result in poor memory utilization. For example, data cache and paging memory are finite resources. Unused data stored in a data cache or in a paging memory may force out used data which may result in higher costs when reaccessing the forced out data.

SUMMARY OF THE INVENTION

A method for improving memory utilization includes measuring an alignment requirement corresponding to each of a plurality of data structures. Storage of the plurality of data structures in a data memory is arranged based on the alignment requirements.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures:

FIGS. 6–13 illustrate exemplary algorithms for performing memory management according to the present invention;

DETAILED DESCRIPTION OF THE INVENTION

Figure 2:
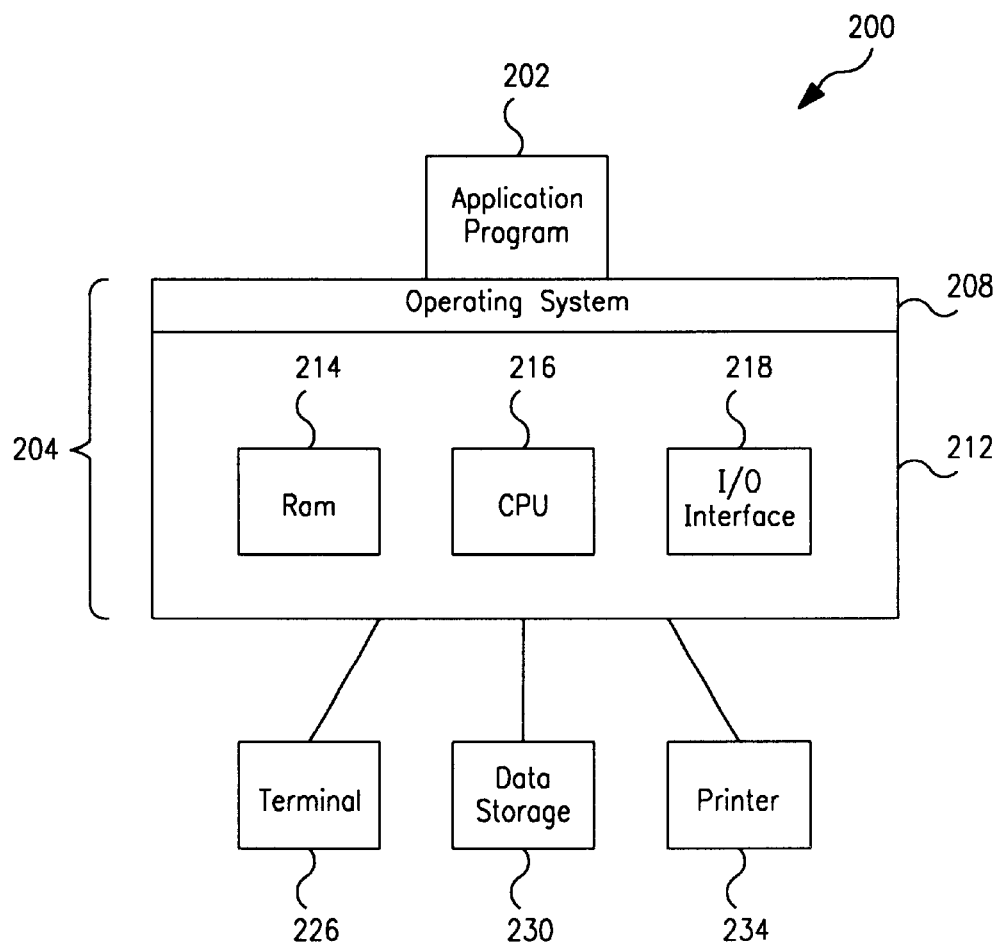
FIG. 2 illustrates a computer system according to an exemplary embodiment of the present invention.

Referring now to the drawing, wherein like reference numerals refer to like elements throughout, FIG. 2 illustrates a computer system 200 for implementing memory management according to the present invention. The computer system 200 includes a computer platform 204. One or more application programs 202 and an operating system 208 operate on the computer platform 204. The computer platform 204 includes a hardware unit 212. The hardware unit 212 includes one or more central processing units (CPUs) 216, a random access memory (RAM) 214 and an input/output (I/O) interface 218. Peripheral components such as a terminal 226, a data storage device 230 and a printing device 234 may be connected to the computer platform 204. An operating system 208 according to the present invention may provide a service to application programs 202 so the applications 202, through the service, may explicitly allocate and deallocate memory off of a heap.

Figure 3:
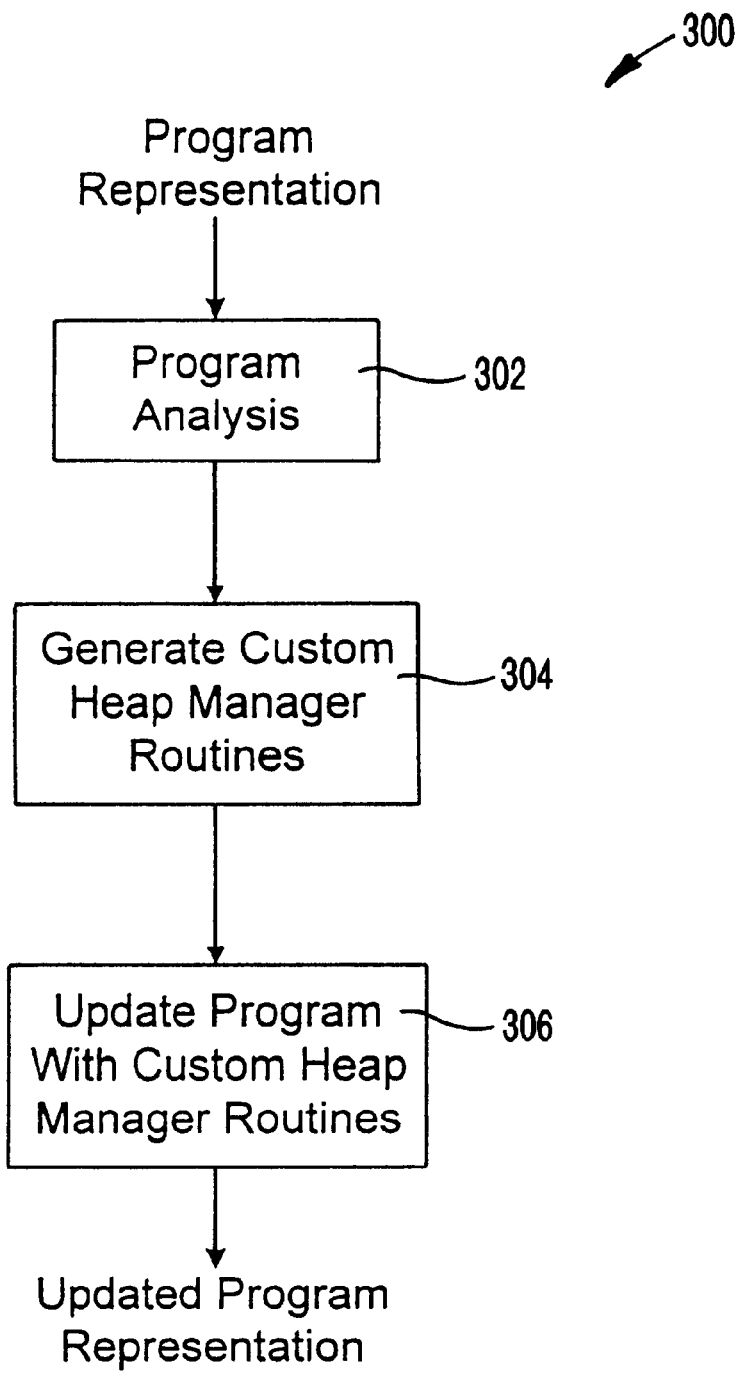
FIG. 3 is a flow chart illustrating an exemplary method according to the present invention.

FIG. 3 is a flow chart 300 illustrating an exemplary memory management method according to the present invention. This exemplary embodiment includes a first phase 302, a second phase 304 and a third phase 306. In the first phase 302 a program representation is received and program analysis is performed on the program representation. The program analysis determines a program's usage of heap memory including determining alignment requirements and sizes of a program's heap allocated data structures. The second phase 304 uses heap memory usage information received from the first phase to generate customized heap managers. In the third phase 306, the program representation is updated to use the customized heap managers and an updated program representation is provided.

Figure 4:
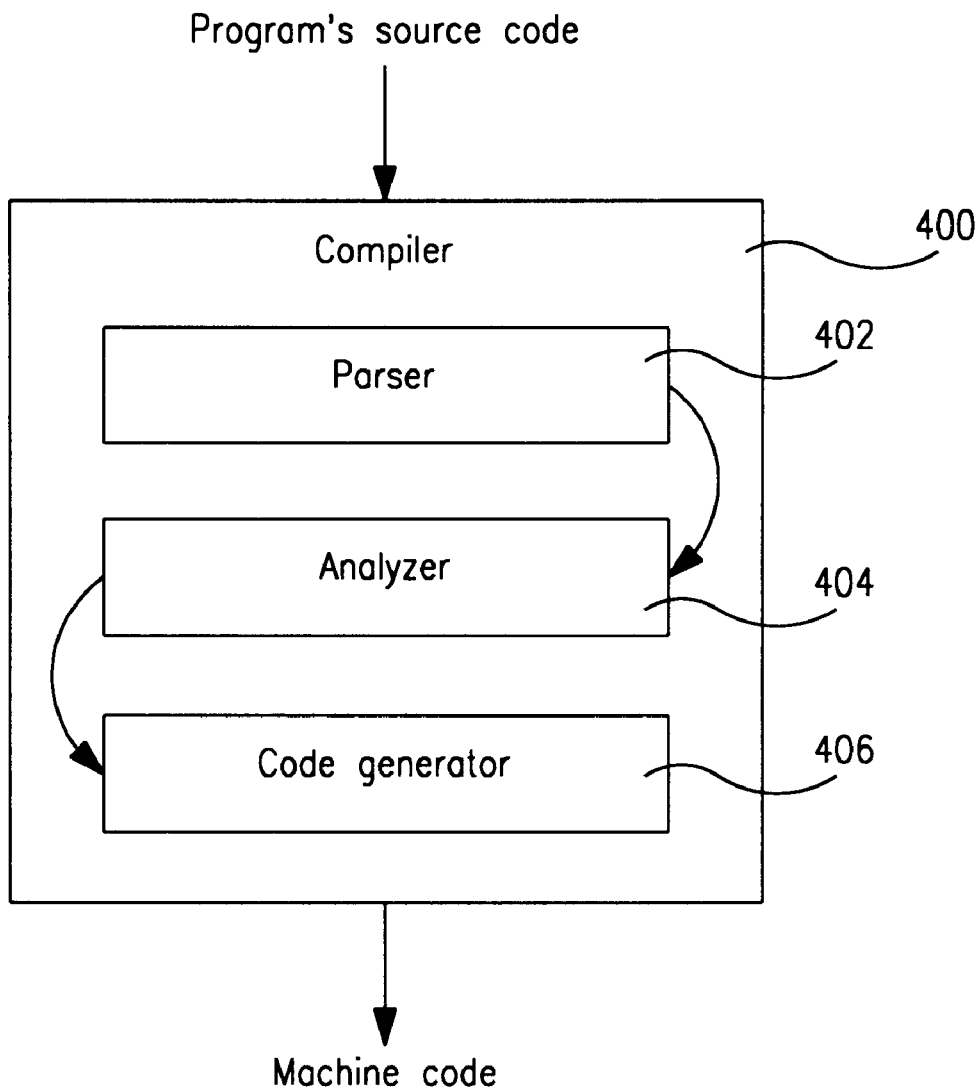
FIG. 4 is a flow chart illustrating a compiler according to an exemplary embodiment of the present invention.

In an exemplary embodiment, a method of memory management according to the present invention is performed by a compiler. FIG. 4 illustrates an exemplary structure of a compiler 400. The compiler 400 receives a program's source code and a parser 402 generates an internal representation of the source code. An analyzer 404 receives the internal representation of the source code and verifies that language semantics are not violated. A code generator 406 generates machine code from the internal representation. In an exemplary embodiment, phase one (step 302 in FIG. 3) of the present invention is performed by a compiler's analyzer 404 and phase two (step 304 in FIG. 3) and phase three (step 306 in FIG. 3) are performed by a compiler's code generator 406.

Figure 5:
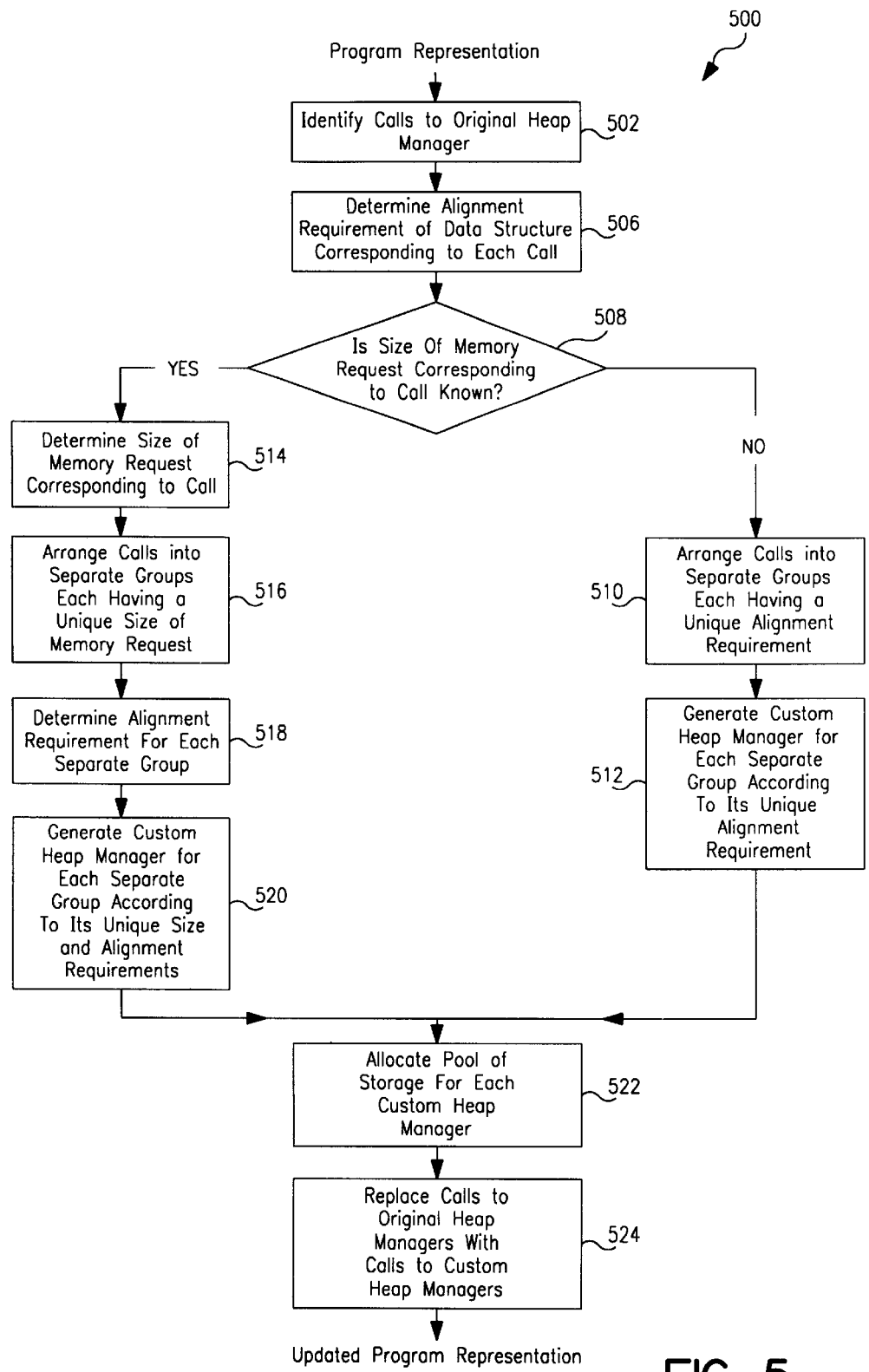
FIG. 5 is a flow chart illustrating another exemplary method according to the present invention.

FIG. 5 shows a flow chart 500 illustrating another exemplary method of memory management according to the present invention. In step 502, a program representation is analyzed to identify calls to original heap managers. In step 506 the alignment requirement of that data structure is identified. In step 508, it is determined whether or not the size of the memory request corresponding to the call to the original heap manager is known. The size of the memory request may not be known if the program analysis is being performed by a compiler before program execution.

In step 510, the memory requests for which the size of the memory requested is unknown are arranged into separate groups. Each separate group includes memory requests having corresponding data structures with the same alignment requirement. In step 512, a custom heap manager is generated for each separate group according to its unique alignment requirement.

If the size of the memory request is determined to be known in step 508, in step 514 the size of that memory request is determined. In step 516, the calls to the original heap managers are arranged into separate groups according to the size of their corresponding memory requests. Each separate group includes requests for memory of the same size.

In step 518, the alignment requirement for each of these separate groups is determined. Although the memory requests in each of the separate groups may correspond to many memory requests for the same size block of memory, each memory request within one of the separate groups may have a corresponding data structure with a different alignment requirement. In this exemplary embodiment, the alignment requirement for the group is the largest alignment requirement of the data structure alignment requirements for the data structures corresponding to that group. In step 520 a custom heap manager is generated,corresponding to each separate group according to the unique size of the memory requests and the alignment requirements of that group.

In step 522, a separate pool of storage may be allocated to each custom heap manager. In step 524, calls to the original heap managers in the program representation are replaced with calls to the customer heap managers and an updated program representation is provided.

FIG. 6 shows an exemplary algorithm for the exemplary method of memory management illustrated in the flow chart of FIG. 5. In phase 1 (lines 1–7) the program representation is analyzed to determine the alignment requirement and the size of each heap allocated data structure. This information is stored in a set of triples (R) including the data structure's type t, the data structure's alignment requirement (alignmentOf(t)) and the size of the memory that is requested (sizeOf(s)).

The alignment requirement of the data structure (alignmentOf(t)) is the size of the largest data type included within the data structure. The alignment requirement may be obtained during compilation by a compiler before execution of the program representation. The size of the memory request (sizeOf(s)) may be unknown because the size of a memory request corresponding to a call to the heap manager may not be known at compile-time.

For phase 2 (lines 8–9) a routine GenerateCustomizedRoutines is called to generate customized heap managers. This routine, shown in FIG. 7, receives the set of triples R and generates an output set of triples S. Each output triple S includes the type t of a data structure and the pair of customized memory management routines to allocate and deallocate the data structure if the size of the memory request is known at compile-time.

For each distinct size of memory request a separate pair of routines, malloc and free, are generated. In this exemplary embodiment, each pair of routines shares its own pool of storage from which they allocate and deallocate memory. Header information is not required because all of the blocks of memory allocated and deallocated by a particular pair of routines are of the same size. When a pair of routines corresponds to different data structure types having different alignment requirements, the largest alignment requirement of the corresponding data structure types is chosen for that pair of routines.

Referring to FIG. 6, phase 3 of the algorithm (lines 10–22) updates the program representation to use the customized heap managers. If the size of a memory request is unknown at compile-time (lines 12–19), the pools of storage are partitioned according to the alignment requirements (lines 16–18; also see steps 510 and 512 in FIG. 5) rather than by size. This results in memory requests with the same alignment requirement and with an unknown size at compile-time being allocated from the same pool of storage although ultimately their sizes may differ. In contrast to the memory requests of known size at compile-time, memory requests of unknown size at compile time allocated according to alignment requirement require headers because their sizes may differ.

When the size of a memory request is known at compile-time, the update program routine is called (line 22) to update the program representation to use the customized memory management routines that were generated in phase 2. As described earlier with regard to step 524 of FIG. 5, an update program routine receives as input a data structure's type and a corresponding pair of heap manager routines along with the original program representation and provides an output of an updated program representation.

FIG. 8 illustrates an exemplary update program algorithm for procedural programming languages. Statements in the program representation are examined (lines 1–3) to identify calls to the heap manager that allocate data structures of type t for which the size of the memory request is known at compile-time. These original heap managers are then replaced with corresponding custom heap managers (lines 7–11). FIG. 9 illustrates an update program routine for object-oriented programming languages. For each element, <t,malloc_1_a,free_1_a>, in S (line 1), the methods new and delete are added to t's class (lines 2–3) such that new calls malloc_1_a and delete calls free_1_a. When new (or delete) is called for t, t's new. (or delete) method is called.

An example of memory management according to the present invention as implemented in a procedural language is illustrated with regard to the C program (original program representation) in FIG. 10 that explicitly manages memory and the corresponding updated C program (updated program representation) shown in FIG. 11. The program has three data structures: T1, T2 and T3. T1 and T2 require 24 bytes of storage and T3 requires 16 bytes of storage. T1 has a double word (eight byte) alignment requirement and T2 and T3 both have a word (four byte) alignment requirement.

The main routine allocates (S2–S5) and deallocates (S6–S9) all three data structures off of the heap. For example, statement S2 allocates a block of memory including a T1 data structure off of the heap and places the block of memory's address in the variable T1_ptr which is a pointer to a T1 data structure. The T1* expression casts a pointer to the memory returned by the heap manager into a T1 data structure. In contrast to statement S2 where the size of the memory request was known, statement S4 allocates an array of T2 data structures off of the heap where the number of elements in the array is unknown at compile-time.

Phase 1 generates the sets of triples R <T1,8,24>, <T2, 4,24>, <T2,4,unknown> and <T3,4,16> corresponding to the calls to the heap allocators in statements S2–S5. Phase 2 generates the sets of triples S <T1, malloc_8_24,free_8_24>, <T2, malloc_8_24,free_8_24>, and <T3, malloc_4_16, free_4_16>. The second and third components of each of the triples S designate routines to allocate and deallocate memory from the heap, respectively. For example, malloc_8_24 allocates 24 bytes of memory that is double word (eight byte) aligned. Although T2's alignment requirement is four bytes, its corresponding custom heap manager's alignment requirement is eight bytes because both T1 and T2 data structures have the same size and the larger of their alignment requirements is used for both.

FIG. 11 illustrates the updated program representation corresponding to the original program representation updated in phase 3 to use the custom heap manager routines. As shown in statements S2, S3 and S5, when the size of a memory request is known at compile time, the program has been updated with corresponding customized heap manager routines. As illustrated by statement S4 in FIG. 11, when the size of the memory request is unknown at compile-time, a corresponding block of memory is allocated off of the heap by a customized heap manager corresponding to the alignment requirement.

In this exemplary embodiment, three separate pools of storage may be used by the custom heap manager routine. A first pool may be used for memory requests having a size of 24 bytes that are double word aligned. A second pool may be used for memory requests for 16 bytes of storage having a word alignment requirement. A third pool may be used for storing data structures having a word alignment requirement without regard to the size of the memory request.

FIG. 12 shows an object oriented application written in C++ (original program representation) that explicitly manages memory. FIG. 13 shows a corresponding updated program representation. The program representation in FIG. 12 includes the same three data structures, T1, T2, and T3 as the program in FIG. 10. Phase I and Phase 2 applied to the program in FIG. 12 produce the same sets of triplets R and S that are produced for the program presented in FIG. 9.

When the size of a memory request is unknown at compile-time, Phase 3 generates the same calls to malloc_4 and free_4 when allocating the array of T2 data structures having an unknown size at compile-time. When the size of a memory request is known at compile-time, however, the UpdateProgram routine that is called is different than for the programs in FIGS. 10 and 11. The UpdateProgram which is called, shown in FIG. 9, updates the class declarations of heap allocated data structures to add new methods new and delete.

As illustrated in FIG. 13, as updated, T1's and T2's new and delete call malloc_8_24 and free_8_24, respectively. T2's new[ ] and delete [ ] call malloc_4 and free_4, respectively. T3's new and delete call malloc_4_16 and free_4_16, respectively. In the updated program representation shown in FIG. 13, calls to new (delete) in statements s2, s3 and s5 (s6, s7 and s8) call the definitions of new (delete) that are defined in the class definitions of T1–T3. For example, the call to new in statement s2 calls the customized new routine that is defined in class T1 and that calls malloc__8__24. When a class does not override the new (or delete) method, the default heap manager routine is used to directly call malloc (or free).

Figure 14:
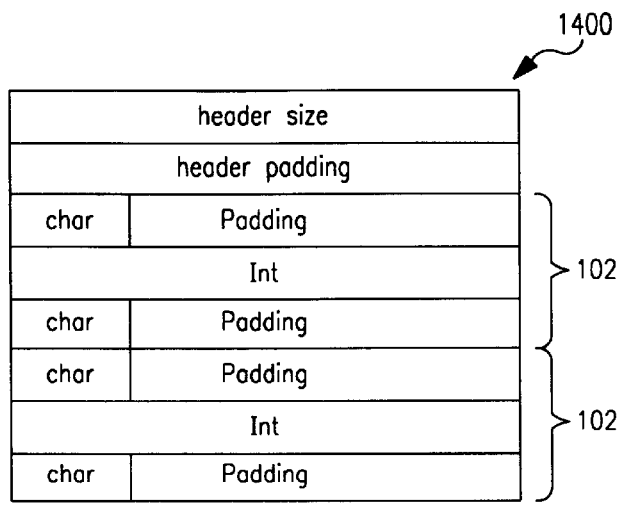
FIG. 14 shows a block of memory for storing two data structures according to a conventional method of memory management.
Figure 15:
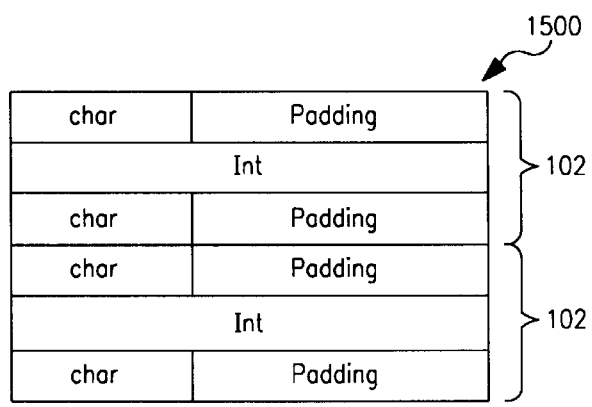
FIG. 15 shows a block of memory for storing two data structures according to the present invention when the size of a memory request is known.
Figure 16:
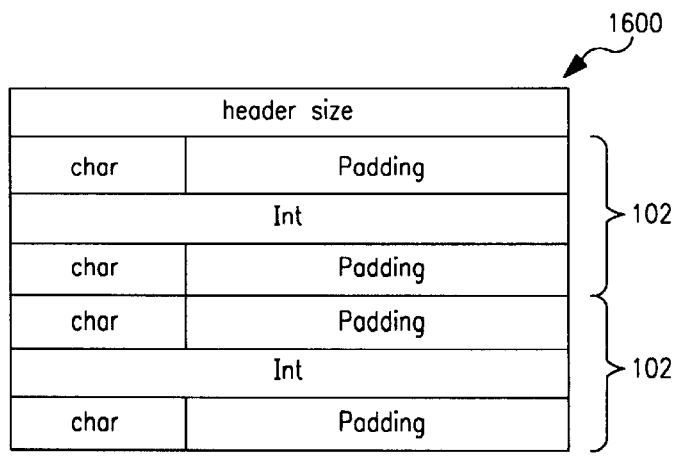
FIG. 16 shows a block of memory for storing two data structures according to the present invention when the size of a memory request is unknown.
Figure 17:
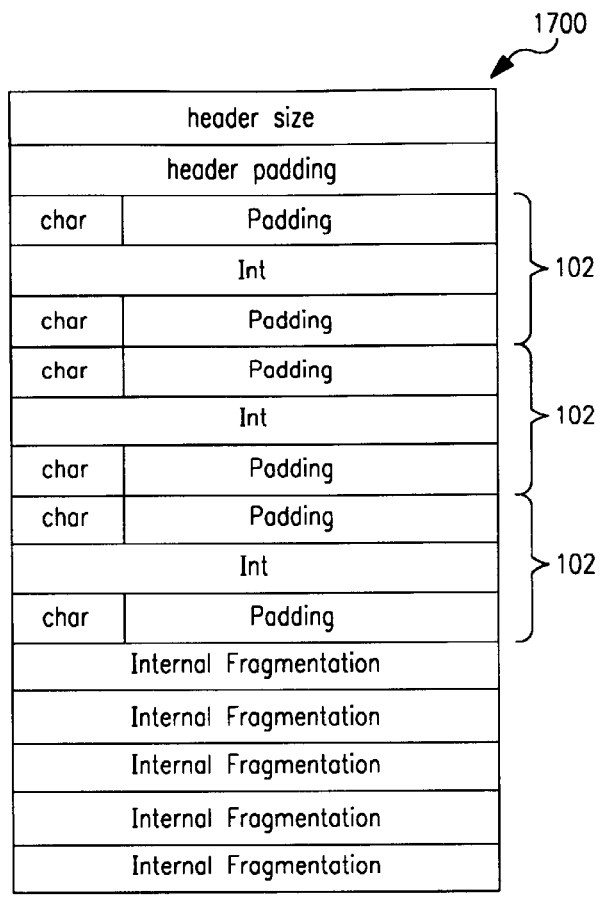
FIG. 17 shows a block of memory for storing three data structures according to a conventional method of memory management.
Figure 18:
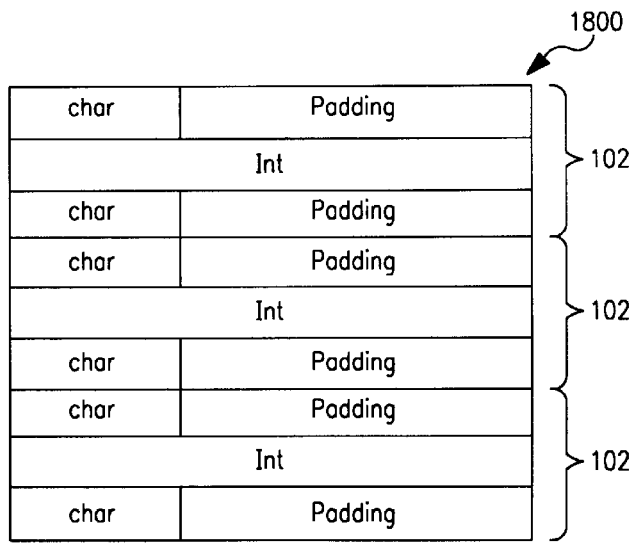
FIG. 18 shows a block of memory for storing three data structures according to the present invention when the size of a memory request is known.
Figure 19:
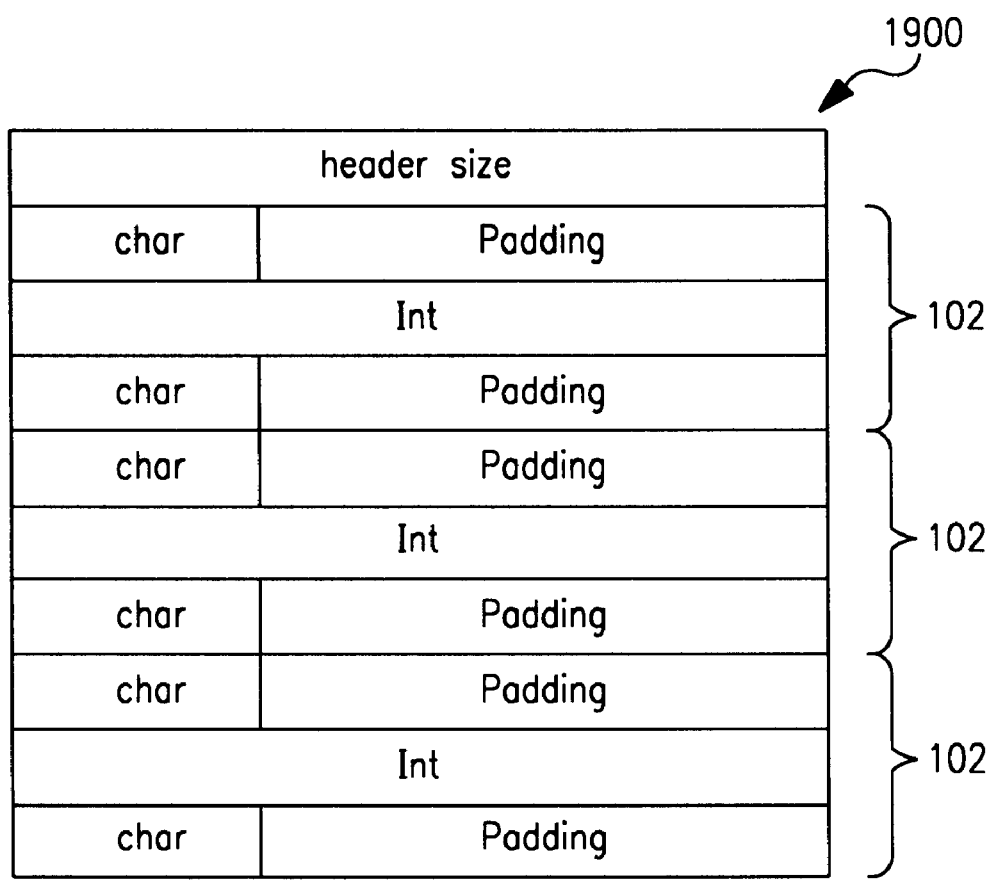
FIG. 19 shows a block of memory for storing three data structures according to the present invention when the size of a memory request is unknown.

The advantage of improved memory utilization provided by using a memory management method according to the present invention is described with regard to FIGS. 14–19. Each row in FIGS. 14–19 represents 4 bytes of memory. FIGS. 14–16 show blocks of memory corresponding to storage of two data structures 102. FIGS. 17–19 show blocks of memory corresponding to storage of three data structures 102.

Figure 1:
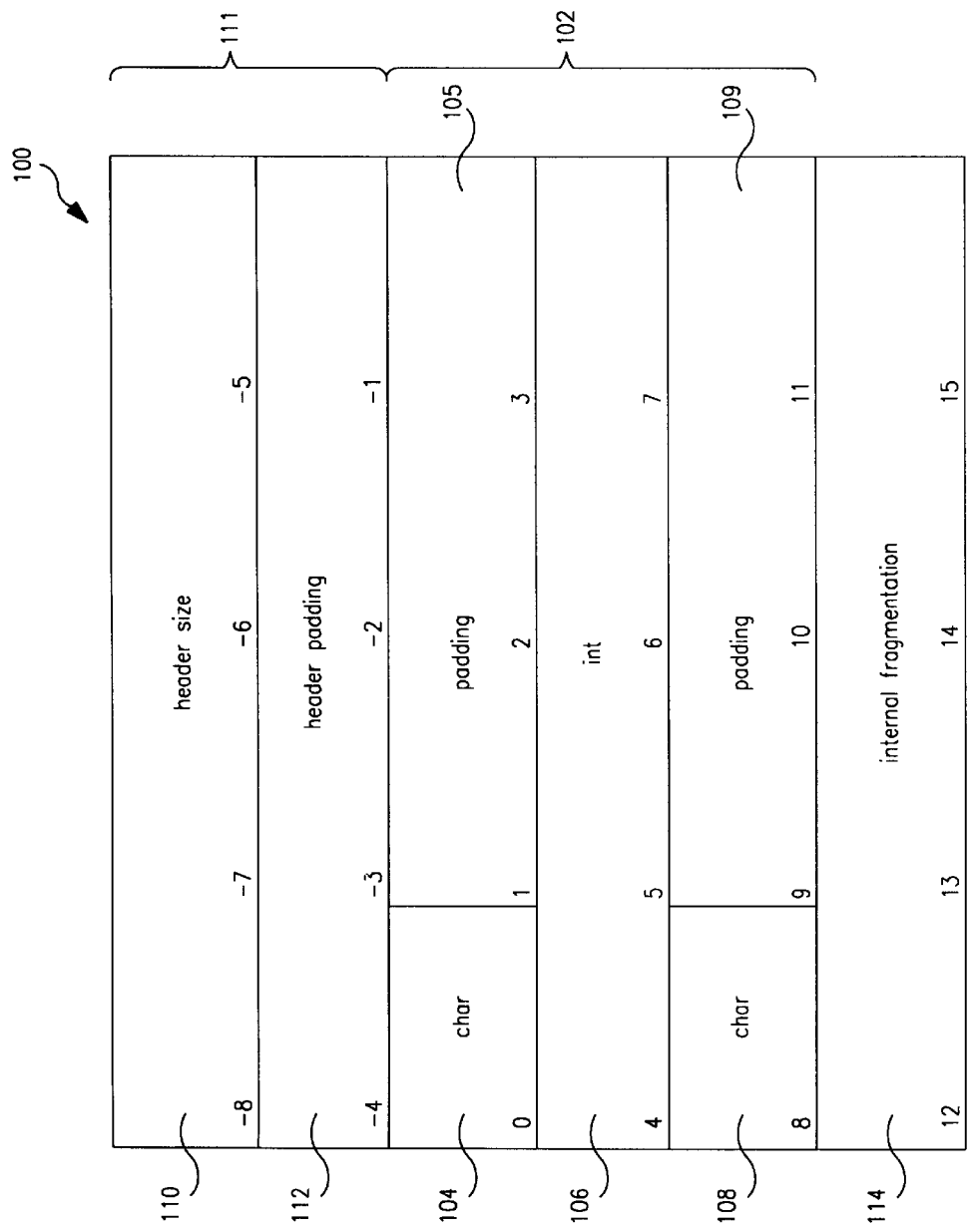
FIG. 1 illustrates a block of memory corresponding to the storage of a data structure.

FIG. 14 shows a block of memory 1400 allocated to store an array of two data structures 102 according to conventional memory management techniques. Similar to the example described with reference to FIG. 1, a header is used to indicate the size of the block of memory since different size blocks are stored in the same pool of storage and the header padding is required because of the double word alignment requirement. In this conventional memory management technique, it is assumed that memory is allocated in predetermined block sizes having sizes in multiples of 32. The size of the memory needed is 32 bytes which happens to be a multiple of 32, resulting in no internal fragmentation.

FIGS. 15 and 16 illustrate blocks of memory 1500, 1600 to store an array of two data structures 102 according to the present invention when the size of the memory request is known and unknown, respectively. Memory block 1500 does not require a header because when the size is known all blocks in the same pool are of the same size. Memory block 1500 does not have any internal fragmentation because the block ends on the correct alignment. Memory block 1600 includes a 4 byte header because the size of the block is not known at compile-time. Memory block 1600 does not include any internal fragmentation because it is stored in a pool according to its own alignment requirement which is 4 bytes.

FIG. 17 shows a block of memory 1700 allocated to store an array of three data structures 102 according to conventional memory management techniques. Compared to block 1400, in addition to an additional data structure 102, block 1700 includes 20 bytes of internal fragmentation because blocks are allocated in sizes in multiples of 32. FIGS. 18 and 19 illustrate blocks of memory 1800, 1900 to store an array of three data structures 102 according to the present invention when the size of the memory request is known and unknown, respectively. Memory block 1800 does not require a header and has no internal fragmentation for the same reasons explained regarding block 1500. Memory block 1900 includes a 4 byte header and has no internal fragmentation for the same reasons explained regarding block 1600. The memory utilization improvement due to the present invention is illustrated in Table 1 below.

TABLE 1

|  | 2 Data Structures | | | 3 Data Structures | | |
| --- | --- | --- | --- | --- | --- | --- |
|  | Block Size | Header Padding | Internal Frag. | Block Size | Header Padding | Internal Frag. |
| Conventional Heap Mgr. | 32 | 4 | 0 | 64 | 4 | 20 |
| Improved Method - Known Size | 24 | 0 | 0 | 36 | 0 | 0 |
| Improved Method - Unknown Size | 28 | 4 | 0 | 40 | 4 | 0 |

In an exemplary embodiment of the present invention, a method for memory management is provided that may be implemented before execution. In comparison to off-line profiling, the exemplary embodiment of the present invention may provide a savings by not requiring source code to be instrumented to gather execution statistics. Further, memory management based on off-line profiling may not provide performance as predictable as that of an exemplary embodiment of the present invention because program execution is often variable and unpredictable and actual program execution may differ from profiled execution.

In an exemplary embodiment of the present invention, a method of memory management considers actual alignment requirement rather than predicted or worst case alignment requirements. This may result in reduced internal fragmentation in comparison to methods that make assumptions regarding alignment requirements.

The present invention is described above as applied to a source code program representation. As known to those skilled in the art, the present invention is not limited to source code program representations and may also be applied to other program representations such as, but not limited to, compiled codes, executable codes and intermediate codes for a multitude of languages.

In contrast to memory management based on profiling statistics, program analysis according to an exemplary embodiment of the present invention provides reliable and consistent memory management for variable program inputs. An exemplary method according to the present invention may be adapted to use information regarding the frequency of execution of a statement. For example, techniques may be used to estimate which data structures are heavily used to determine appropriate pool sizes or alignments. Alternatively, profiling may be combined with program analysis to determine which pool size is most frequently requested. The frequency information may then be used to reallocate memory for a pool or combine pools.

When original heap managers allocate large blocks of heap storage for both large and small blocks of data, space overhead for fragmentation and headers may be proportionally higher for small blocks of data compared to large blocks of data. Reducing fragmentation and header overhead for large blocks of storage may have a smaller impact on overall space reduction. In an exemplary embodiment of the present invention, a method of memory management according to the present invention is used to provide custom heap managers for allocating and deallocating blocks of storage smaller than a predetermined size. In another exemplary embodiment, custom heap managers allocate and deallocate blocks of storage when unused space due to heap allocation increases the size of the block that is allocated over the requested size by a threshold percentage. This threshold percentage may range between 10% and 20%, for example.

Real-time optimizing compilers, also known as adaptive or dynamic compilers, use the behavior of a current execution of a portion of a program representation to adaptively recompile the portion of for future execution. As known to those skilled in the art, a method of memory management according to the present invention may be incorporated into a real-time optimizing compiler.

As known to those skilled in the art, an exemplary embodiment of the present invention may be adapted to the different types, sizes and alignment requirements for data structures according to a particular program representation. For example, a program representation may include fewer memory requests for memory of a known particular size relative to memory requests for memory of other sizes. Although these sizes may be known at compile-time, in an exemplary embodiment of the present invention these few memory requests may then be allocated and deallocated according to their alignment requirement rather than based on their size.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. A method for increasing memory utilization comprising the steps of:
   (a) measuring an alignment requirement corresponding to each of a plurality of data structures;
   (b) arranging storage of said plurality of data structures in a data memory based on said alignment requirements, wherein step (a) further includes the step of measuring a size requirement corresponding to each of said plurality of data structures and step (b) comprises arranging storage of said plurality of data structures in said data memory based on said alignment requirements and said size requirements; and
   (c) reading a program representation from a program memory, said program representation including a call to an original heap manager corresponding to one of said plurality of data structures wherein said original heap manager is adapted to allocate and deallocate a first portion of said data memory corresponding to said one of said plurality of data structures, wherein step (b) includes the steps of selectively:
   (b1) generating a custom heap manager corresponding to said original heap manager wherein said custom heap manager is adapted to allocate and deallocate a second portion of said data memory according to at least one of said alignment requirement and said size requirement of said one of said plurality of data structures; and
   (b2) replacing said call to said original heap manager with a call to said custom heap manager.

2. The method for increasing memory utilization according to claim 1 wherein when said size requirement of said one of said plurality of data structures is unknown, said call to said original heap manager is replaced with a call to said custom heap manager adapted to allocate and deallocate said second portion of said data memory according to said alignment requirement of said one of said plurality of data structures.

3. The method for increasing memory utilization according to claim 1 wherein when said size requirement for said one of said plurality of data structures is known, said call to said original heap manager is replaced with a call to said custom heap manager adapted to allocate and deallocate said second portion of said data memory according to said size requirement of said one of said plurality of data structures.

4. The method for increasing memory utilization according to claim 3 wherein selected data structures of said plurality of data structures have size requirements equal to said size requirement of said one of said plurality of data structures and said custom heap manager is adapted to allocate and deallocate said second portion of said data memory according to an alignment requirement equal to a largest alignment requirement of said alignment requirements of said selected data structures.

5. The method for increasing memory utilization according to claim 1, wherein said data structures are included in a program representation and steps (a) and (b) are performed before executing said program representation.

6. The method for increasing memory utilization according to claim 1 wherein steps (b1) and (b2) are selectively performed when said one of said plurality of data structures has a size requirement less than a predetermined size.

7. The method for increasing memory utilization according to claim 1 wherein a separate pool of storage in said data memory is allocated to said custom heap manager.

8. The method for increasing memory utilization according to claim 1, wherein said alignment requirement corresponding to each one of said plurality of data structures is the size of a largest data unit included within each respective one of said plurality of data structure.

9. An apparatus for increasing memory utilization comprising:
   measuring means for measuring an alignment requirement corresponding to each of a plurality of data structures;
   arranging means for arranging storage of said plurality of data structures in a data memory based on said alignment requirements;
   wherein said measuring means measures a size requirement corresponding to each of said plurality of data structures and said arranging means arranges storage of said plurality of data structures in said data memory based on said alignment requirements and said size requirements; and
   means for reading a program representation from a program memory, said program representation including a call to an original heap manager corresponding to one of said plurality of data structures, wherein said original heap manager is adapted to allocate and deallocate a first portion of said data memory corresponding to said one of said plurality of data structures;
   means for generating a custom heap manager corresponding to said original heap manager wherein said custom heap manager is adapted to allocate and deallocate a second portion of said data memory according to at least one of said alignment requirement and said size requirement of said one of said plurality of data structures; and
   means for replacing said call to said original heap manager with a call to said custom heap manager.

10. A program storage device readable by machine, tangibly embodying a program of instructions executable by the machine to perform method steps for increasing memory utilization, said method steps comprising:
    (a) measuring an alignment requirement corresponding to each of a plurality of data structures;
    (b) arranging storage of said plurality of data structures in a data memory based on said alignment requirements, wherein step (a) further includes the step of measuring a size requirement corresponding to each of said plurality of data structures and step (b) comprises arranging storage of said plurality of data structures in said data memory based on said alignment requirements and said size requirements; and (c) reading a program representation from a program memory, said program representation including a call to an original heap manager corresponding to one of said plurality of data structures wherein said original heap manager is adapted to allocate and deallocate a first portion of said data memory corresponding to said one of said plurality of data structures.

* * * * *